(12) United States Patent
Min et al.

(10) Patent No.: US 12,240,156 B2
(45) Date of Patent: Mar. 4, 2025

(54) INJECTION MOLDING DEVICE AND METHOD FOR INJECTION MOLDING

(71) Applicant: LG CHEM, LTD., Seoul (KR)

(72) Inventors: Inki Min, Daejeon (KR); Cheol Hwan Hwang, Daejeon (KR)

(73) Assignee: LG CHEM, LTD., Seoul (KR)

( * ) Notice: Subject to any disclaimer, the term of this patent is extended or adjusted under 35 U.S.C. 154(b) by 165 days.

(21) Appl. No.: 17/426,552

(22) PCT Filed: Feb. 13, 2020

(86) PCT No.: PCT/KR2020/002045
§ 371 (c)(1),
(2) Date: Jul. 28, 2021

(87) PCT Pub. No.: WO2020/197092
PCT Pub. Date: Oct. 1, 2020

(65) Prior Publication Data
US 2022/0105694 A1    Apr. 7, 2022

(30) Foreign Application Priority Data

Mar. 26, 2019  (KR) .................. 10-2019-0034619

(51) Int. Cl.
*B29C 45/07*    (2006.01)
*B29C 33/42*    (2006.01)
(Continued)

(52) U.S. Cl.
CPC ............ *B29C 45/076* (2013.01); *B29C 33/42* (2013.01); *B29C 33/424* (2013.01); *B29C 35/02* (2013.01); *B29C 45/0441* (2013.01); *B29C 45/07* (2013.01); *B29C 45/26* (2013.01); *B29C 45/2602* (2013.01); *B29C 45/2681* (2013.01); *B29C 45/73* (2013.01); *B29C 71/02* (2013.01); *B29D 11/0048* (2013.01);
(Continued)

(58) Field of Classification Search
CPC .......................... B29C 45/162; B29C 45/2681
See application file for complete search history.

(56) References Cited

U.S. PATENT DOCUMENTS

| 4,449,913 A | * | 5/1984 | Krishnakumar ........ B29C 49/06 264/161 |
| 4,786,455 A |  | 11/1988 | Krishnakumar et al. |

(Continued)

FOREIGN PATENT DOCUMENTS

| CN | 102470580 A | 5/2012 |
| CN | 103328176 A | 9/2013 |

(Continued)

*Primary Examiner* — Benjamin A Schiffman
(74) *Attorney, Agent, or Firm* — BRYAN CAVE LEIGHTON PAISNER LLP

(57) ABSTRACT

An injection molding device according to an embodiment of the present disclosure includes a first mold including a first injection port through which a raw material is injected; a second mold including a heating member; a first movable mold facing the first mold or the second mold and having a first cavity formed therein; and a second movable mold facing the first mold or the second mold and having a second cavity formed therein, wherein the position of the first movable mold and the position of the second movable mold can be changed.

13 Claims, 8 Drawing Sheets

(51) Int. Cl.
    *B29C 35/02*     (2006.01)
    *B29C 45/04*     (2006.01)
    *B29C 45/26*     (2006.01)
    *B29C 45/73*     (2006.01)
    *B29C 71/02*     (2006.01)
    *B29D 11/00*     (2006.01)
    *B29C 35/04*     (2006.01)
    *B29C 35/08*     (2006.01)
    *B29C 45/16*     (2006.01)
    *B29L 11/00*     (2006.01)

(52) U.S. Cl.
    CPC ..... *B29C 2035/0211* (2013.01); *B29C 35/049* (2013.01); *B29C 2035/0811* (2013.01); *B29C 45/045* (2013.01); *B29C 45/1628* (2013.01); *B29C 2045/7356* (2013.01); *B29C 2071/022* (2013.01); *B29L 2011/00* (2013.01); *B29L 2011/0016* (2013.01)

(56) References Cited

U.S. PATENT DOCUMENTS

| | | | |
|---|---|---|---|
| 8,163,218 B2 * | 4/2012 | Kato | B29C 45/1628 |
| | | | 264/328.8 |
| 8,550,800 B2 * | 10/2013 | Miyagawa | B29C 45/1628 |
| | | | 425/130 |
| 10,279,520 B2 | 5/2019 | Schum et al. | |
| 2012/0087999 A1 | 4/2012 | Miyagawa et al. | |
| 2013/0345384 A1 | 12/2013 | Rendon et al. | |
| 2016/0161647 A1 | 6/2016 | Masuyama et al. | |
| 2018/0001529 A1 | 1/2018 | Altonen et al. | |
| 2021/0359205 A1 * | 11/2021 | Hwang | H10N 70/231 |

FOREIGN PATENT DOCUMENTS

| | | |
|---|---|---|
| CN | 106182574 A | 12/2016 |
| CN | 107379392 A | 11/2017 |
| EP | 1892074 A1 | 2/2008 |
| JP | H06210660 A | 2/1994 |
| JP | 2007-069403 A | 3/2007 |
| JP | 2007-317270 A | 12/2007 |
| JP | 2008-290383 A | 12/2008 |
| JP | 2009045816 A | 3/2009 |
| JP | 2009-101670 A | 5/2009 |
| JP | 2009137162 A | 6/2009 |
| JP | 2012056294 A * | 3/2012 |
| JP | 2013-237181 A | 11/2013 |
| KR | 10-2011-0038920 A | 4/2011 |
| KR | 10-1226675 B1 | 1/2013 |
| KR | 10-2013-0062121 A | 6/2013 |
| KR | 10-1485871 B1 | 1/2015 |
| KR | 10-2016-0000427 A | 1/2016 |
| KR | 10-2018-0111170 A | 10/2018 |
| KR | 10-2018-0131363 A | 12/2018 |
| WO | 198202849 A1 | 9/1982 |
| WO | 2011/070608 A1 | 6/2011 |

* cited by examiner

【FIG. 1】
PRIOR ART
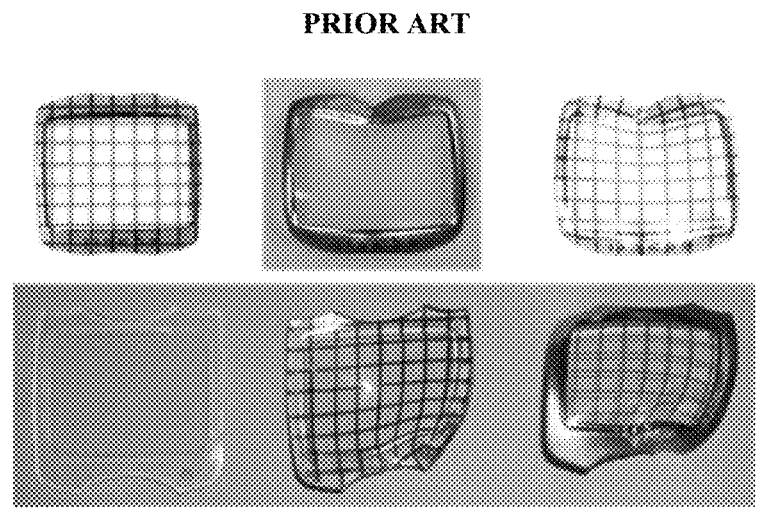
【FIG. 2】
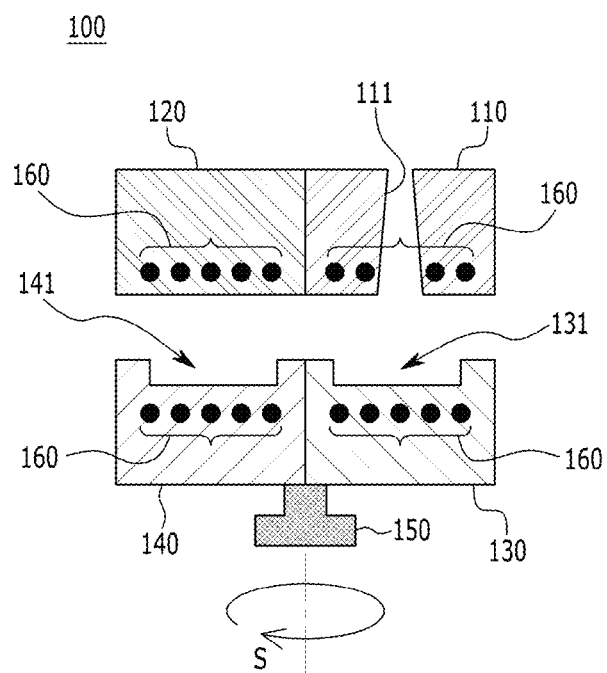

[FIG. 3]
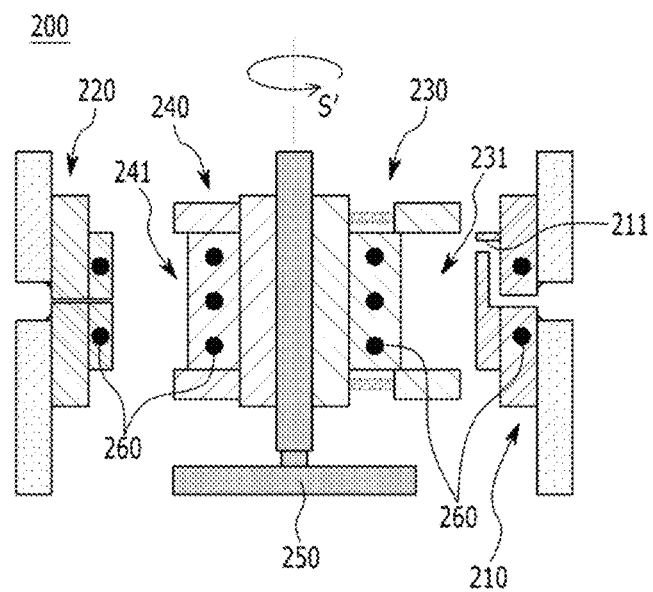
[FIG. 4]
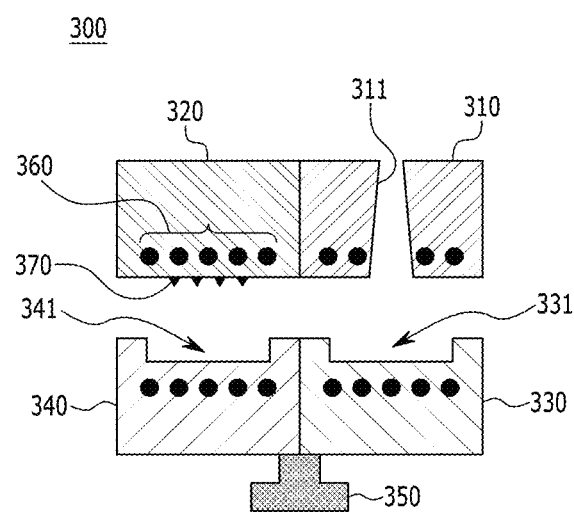

[FIG. 5]
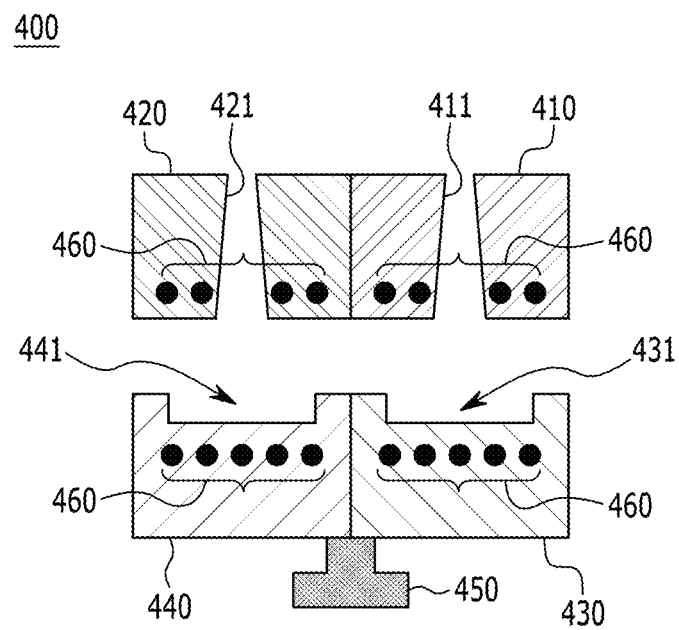
[FIG. 6]
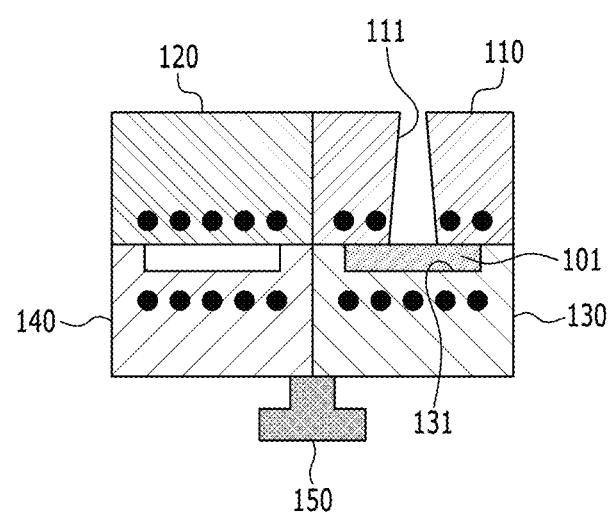

[FIG. 7]
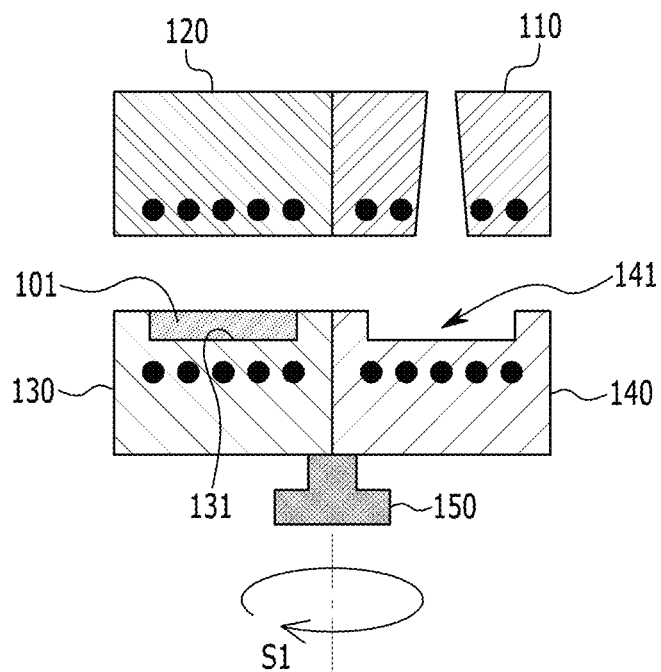
[FIG. 8]
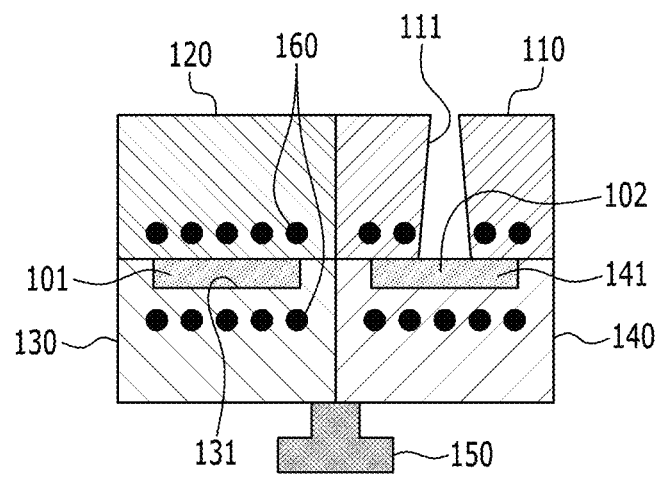

[FIG. 9]
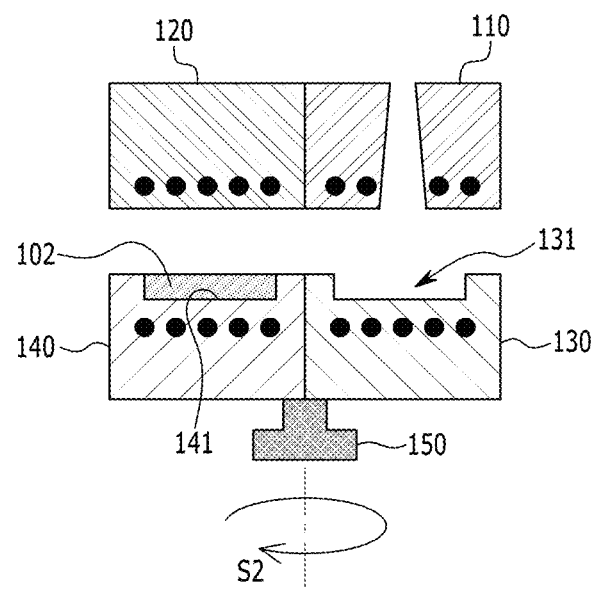
[FIG. 10]
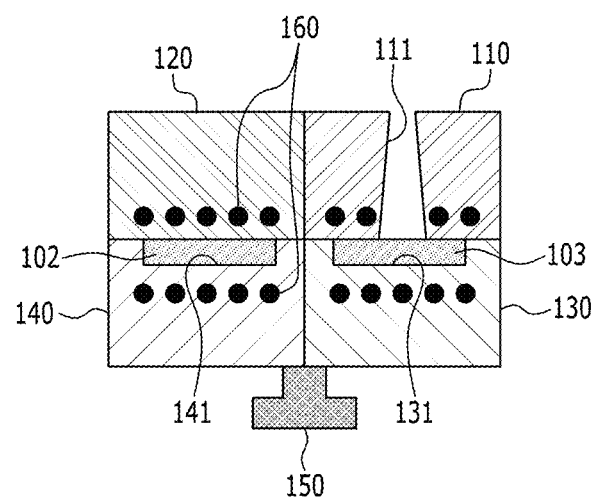

[FIG. 11]
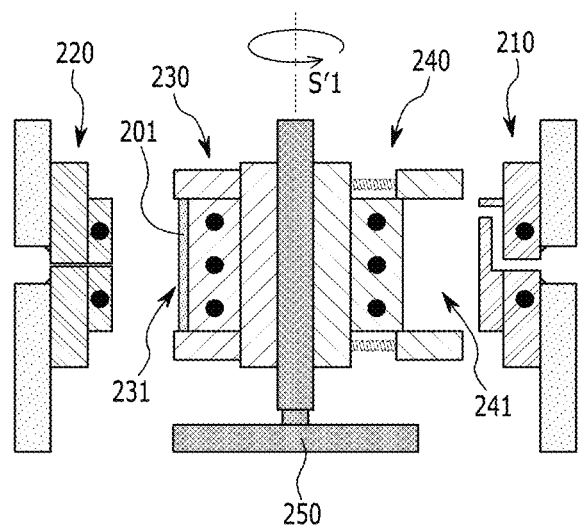
[FIG. 12]
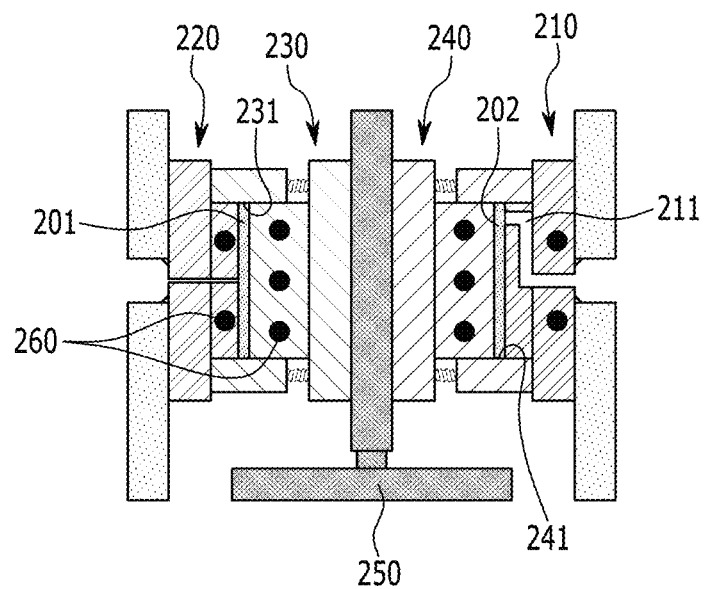

[FIG. 13]
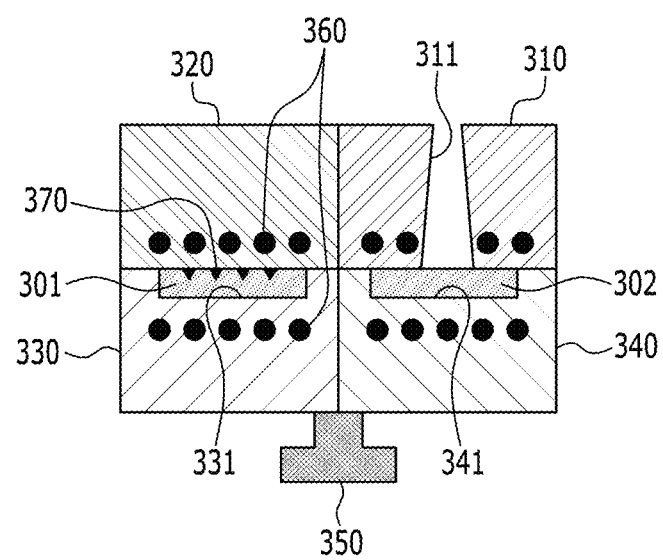
[FIG. 14]
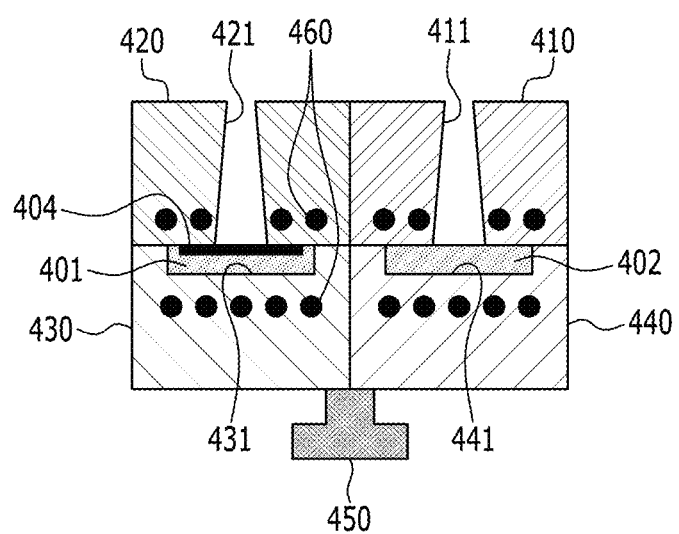

[FIG. 15]
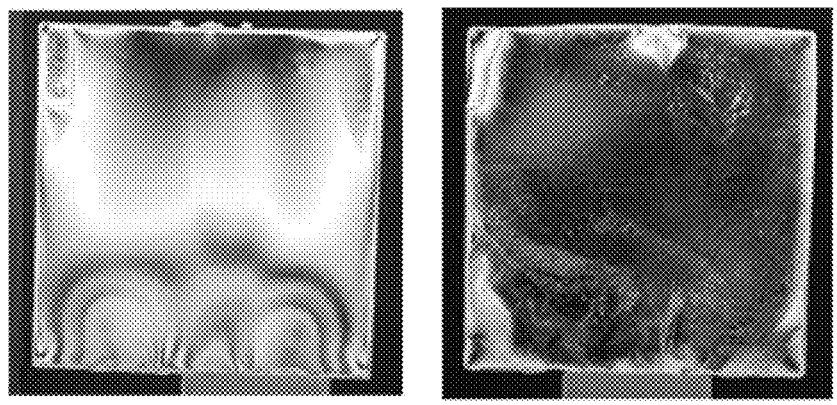

INJECTION MOLDING DEVICE AND METHOD FOR INJECTION MOLDING

The present application is a national phase entry of International Application No. PCT/KR2020/002045 filed on Feb. 13, 2020, and claims priority to and the benefit of Korean Patent Application No. 10-2019-0034619 filed on Mar. 26, 2019, the disclosures of which are incorporated herein by reference in their entirety.

FIELD

The present disclosure relates to an injection molding device and a method for injection molding, and more particularly, to an injection molding device and a method for injection molding capable of manufacturing a plastic optical product with reduced birefringence.

BACKGROUND

Injection molding is a molding method for a thermoplastic resin in which a molten material is injected into a closed mold under high pressure by means of an injection cylinder, wherein an internal space of a mold into which the molten material is injected is referred to as a cavity.

In the case of plastic products, especially optical products, manufactured by a conventional injection molding processes, there is high pressure near the injection port due to the characteristics of the injection molding process, and exhibits a distribution where pressure gradually decreases in accordance with the flow distance.

The birefringence phenomenon and deterioration of the transferability of fine patterns resulting therefrom causes deterioration of optical properties that are not confirmed with the naked eye. In addition, high birefringence leads to residual stress and may induce a phenomenon that the product bends or may cause cracks.

Birefringence distribution is one of the main factors determining the quality of plastic products, and it is difficult to obtain a plastic optical product having a low birefringence distribution by the conventional injection molding process.

In order to reduce birefringence, a method of separately performing an annealing process for a molded product after molding, or performing compression molding, is known. However, because the mold is complicated and process variables tend to increase, it is difficult to apply the method in an industrial site, and the annealing process has a problem in that it is difficult to predict the deformation of a subsequent product.

FIG. 1 is a collection of photographs showing optical products manufactured according to a conventional molding process, after being annealed in a high temperature chamber. Referring to FIG. 1, it can be confirmed that deformation of the product is caused by annealing.

SUMMARY

Embodiments of the present disclosure have been designed to solve the above-mentioned problems. Therefore, an object of the present disclosure is to provide an injection molding device that not only is capable of manufacturing a plastic product with reduced birefringence or internal stress, but also is advantageous for mass production of plastic products through a continuous process, and a method for injection molding using the injection molding device.

According to an embodiment of the present disclosure, there is provided an injection molding device comprising: a first mold including a first injection port through which a raw material is injected; a second mold including a heating member; a first movable mold facing the first mold or the second mold and having a first cavity formed therein; and a second movable mold facing the first mold or the second mold and having a second cavity formed therein, wherein the position of the first movable mold and the position of the second movable mold can be changed.

The first movable mold and the second movable mold may be integrated with each other, and may further include a rotating device capable of changing the position of the first movable mold and the position of the second movable mold.

The first movable mold and the second movable mold may be integrated such that an opening direction of the first cavity and an opening direction of the second cavity are identical to each other.

The first mold and the second mold may be integrated with each other.

The first movable mold and the second movable mold may be integrated such that an opening direction of the first cavity and an opening direction of the second cavity are opposite to each other.

The first mold and the second mold may be separated from each other, with the first movable mold and the second movable mold being interposed therebetween.

The first movable mold and the second movable mold may include a heating member.

The heating member may include at least one of induction heating element, electric heater, planar heating element, steam heating and heating wire type.

An embossed or intaglio pattern may be formed on the surface of the second mold.

The second mold may further include a second injection port through which an additional raw material is injected.

According to another embodiment of the present disclosure, there is provided a method for injection molding comprising the steps of: injecting a raw material into a first cavity of a first movable mold facing a first mold and molding the material to produce a primary molded product; moving the position of the first movable mold so that the primary molded product faces a second mold; heating and then cooling the second mold to anneal the primary molded product; and injecting a raw material into a second cavity of a second movable mold facing the first mold and molding the material to produce a secondary molded product.

Annealing the primary molded product and producing the secondary molded product may be performed simultaneously.

Moving the position of the first movable mold may be performed once or more, repeatedly.

Heating the second mold may be performed through a heating member inside the second mold.

The heating member may include at least one of induction heating element, electric heater, planar heating element, steam heating and heating wire type.

The method may further comprise the steps of: moving the position of the second movable mold so that the secondary molded product faces the second mold; heating and then cooling the second mold to anneal the secondary molded product; and injecting a raw material into the first cavity of the first movable mold facing the first mold and molding the material to produce a tertiary molded product.

Annealing the secondary molded product and producing the tertiary molded product may be performed simultaneously.

Each of the second mold, the first movable mold, and the second movable mold may include a heating member therein, wherein in the step of annealing the primary molded product, the first movable mold may be heated together with the second mold, followed by cooling, and in the step of annealing the secondary molded product, the second movable mold may be heated together with the second mold, followed by cooling.

An embossed or intaglio pattern may be formed on the surface of the second mold, wherein the step of annealing the primary molded product may include forming a shape corresponding to the embossed or intaglio pattern on the primary molded product.

The first movable mold and the second movable mold may be integrated with each other, wherein the integrated first movable mold and second movable mold may rotate to change their positions.

The first movable mold and the second movable mold may be integrated so that an opening direction of the first cavity and an opening direction of the second cavity are identical to each other.

The first movable mold and the second movable mold may be integrated so that the opening direction of the first cavity and an opening direction of the second cavity are opposite to each other.

Annealing the primary molded product may include injecting an additional raw material into the primary molded product.

According to embodiments of the present disclosure, an annealing process and an injection molding process are performed via a movable mold, and thereby, a plastic product with reduced birefringence or internal stress can be mass-produced without any separate additional complicated processes.

BRIEF DESCRIPTION OF THE DRAWINGS

FIG. 1 is a collection of photographs showing optical products manufactured according to a conventional molding process, after being annealed.

FIG. 2 is a schematic plane view of an injection molding device according to an embodiment of the present disclosure.

FIGS. 3 to 5 are schematic plane views of injection molding devices according to additional embodiments of the present disclosure.

FIGS. 6 to 10 are plane views illustrating an injection molding method using the injection molding device according to FIG. 2.

FIGS. 11 and 12 are plane views illustrating an injection molding method using the injection molding device according to FIG. 3.

FIG. 13 is a plane view illustrating an injection molding method using the injection molding device according to FIG. 4.

FIG. 14 is a plane view illustrating an injection molding method using the injection molding device according to FIG. 5.

FIG. 15 is a photograph of a plastic product manufactured through an injection molding device according to an embodiment of the present disclosure.

DETAILED DESCRIPTION

Hereinafter, various embodiments of the present disclosure will be described in detail with reference to the accompanying drawings so that those skilled in the art may easily implement the present disclosure. The present disclosure may be modified in various different ways, and is not limited to the embodiments described herein.

Parts that are irrelevant to the description will be omitted to clearly describe the present disclosure, and like reference numerals designate like elements throughout the specification.

Further, in the drawings, the size and thickness of each element are arbitrarily illustrated for convenience of description, and the present disclosure is not necessarily limited to those illustrated in the drawings. In the drawings, the thickness of layers, regions, etc. are exaggerated for clarity. In the drawings, for convenience of description, the thicknesses of some layers and regions are exaggerated.

In addition, it will be understood that when an element such as a layer, film, region, or plate is referred to as being "on" or "above" another element, it can be directly on the other element or intervening elements may also be present. In contrast, when an element is referred to as being "directly on" another element, it means that other intervening elements are not present. Further, the word "on" or "above" means disposed on or below a reference portion, and does not necessarily mean being disposed on the upper side of the reference portion toward the opposite direction of gravity.

Further, throughout the specification, when a part is referred to as "including" a certain component, it means that it can further include other components, without excluding the other components, unless otherwise stated.

FIG. 2 is a schematic plane view of an injection molding device 100 according to an embodiment of the present disclosure.

Referring to FIG. 2, the injection molding device 100 according to an embodiment of the present disclosure includes: a first mold 110 including a first injection port 111 into which a raw material is injected, a second mold 120 including a heating member 160, a first movable mold 130 facing the first mold 110 and having a first cavity 131 formed therein, and a second movable mold 140 facing the second mold 120 and having a second cavity 141 formed therein. The raw material may include a molten resin for molding plastic products.

The positions of the first mold. 110 and the second mold 120 are fixed, but the first movable mold 130 and the second movable mold 140 may change positions with each other. Thus, unlike the arrangement illustrated in FIG. 2, the first movable mold 130 may face the second mold 120, and the second movable mold 140 may face the first mold 110.

In particular, the position change of the first movable mold 130 and the second movable mold 140 may be made through a rotating device 150. The side surfaces of the first movable mold 130 and the second movable mold 140 may be integrated so that the opening direction of the first cavity 131 and the opening direction of the second cavity 141 are identical to each other, and the rotating device 150 may be located at a lower end of the first movable mold 130 and the second movable mold 140. Therefore, the first movable mold 130 and the second movable mold 140 can change positions with each other by the rotation S of the rotating device 150. At this time, the rotation axis of the rotation S is preferably parallel to the opening direction of the first cavity 131 and the opening direction of the second cavity 141.

Further, as shown in FIG. 2, it is preferable that the side surfaces of the first mold 110 and the second mold 120 are also integrated. This is because the first mold 110 and the second mold 120 must be in contact with the first movable mold 130 and the second movable mold 140 at the same time.

In a state where the first mold 110 and the first movable mold 130 are in contact with each other, the injected raw material is injected into the first cavity 131 of the first movable mold 130 through the first injection port 111 of the first mold 110, and then molding is performed into the shape of the first cavity 131. That is, in the first mold 110, injection and molding are performed together with the first movable mold 130 or the second movable mold 140. At this time, if the first injection port 111 can inject a raw material, the number or location thereof is not particularly limited.

In the second mold 120, annealing heat treatment is performed on a molded product produced by injection molding. That is, after the molded product manufactured in the first mold 110 is moved to the second mold 120 through the positional change of the first movable mold 130 and the second movable mold 140 by the rotating device 150, annealing is performed. A specific injection molding method will be described later in detail with reference to FIGS. 6 to 10.

For annealing, it is preferable that the second mold 120 includes a heating member 160. Through the process in which the heating member 160 rapidly heats the second mold 120, followed by gradually cooling, annealing is performed on a molded product in contact with the second mold 120. When the molding is a plastic resin, it is preferable that annealing is performed at a temperature equal to or higher than the glass transition temperature of the resin.

In addition, since the annealing process is performed in a state where the second mold 120 is in contact with the first movable mold 130 or the second movable mold 140, with a molded product being interposed therebetween, it is preferable that the movable mold 130 and the second movable mold 140 also include a heating member 160 for more effective temperature control.

The injection molding device 100 according to the present exemplary embodiment does not take out a molded product subjected to injection molding, from the first mold 110, but moves directly to the second mold 120 to perform an annealing process. Since the annealing process is performed in the mold, the polymers oriented in the molded product become relaxed, so it is possible to effectively reduce birefringence or internal stress, which may occur in plastic products manufactured by conventional injection molding methods. Eventually, problems such as deterioration of optical properties, bending of a molded product, or cracking of a molded product, which may occur due to birefringence, can be significantly reduced. This will be described again below with reference to FIG. 15.

Further, in the conventional molding processes, deformation of the product may occur when annealing is performed in a high temperature chamber to relieve internal stress. In the present embodiment, since the annealing process is performed in a state in which the molded product is located inside the mold, it is possible to prevent the problem of product deformation due to heat treatment.

In addition, deformation may occur depending on the extent of molecular orientation or fiber orientation of each product after injection molding, but as in this embodiment, if annealing is performed in a mold, deformation according to the extent of orientation after injection molding can be minimized.

Moreover, an annealing process for a molded product may be performed in the second mold 120, and at the same time, injection molding of other molded products may be performed in the first mold 110. That is, since the injection molding process and the annealing process can be simultaneously performed through the first movable mold 130 and the second movable mold 140 that can change positions with each other, mass production of the molded product is possible through a continuous process, without complication. Mass production is possible. This will also be described later in detail with reference to FIGS. 6 to 10.

Meanwhile, during injection molding, the first mold 110 may also include a heating member 160 to maintain the temperature of the first mold 110. That is, the healing member 160 is preferably located not only in the second mold 120, but also in each of the first movable mold 130, the second movable mold 140, and the first mold 110.

The heating member 160 is not particularly limited in its form or method as long as it can heat the first mold 110, the second mold 120, the first movable mold 130, or the second movable mold 140, but as shown in FIG. 2, it is preferable that it is in heating wire form located inside respective molds 110, 120, 130 and 140. In addition, although shown as a plurality of heating wires, it is needless to say that the number of heating wires can be freely set as necessary. The heating element 160 in the form of a heating wire may be a sheath heater.

Further, the heating member 160 may be in the form of induction heating element, electric heater, planar heating element, or steam heating for rapid heating, and as the heating energy is higher and the surface temperature rise of the molds 110, 120, 130 and 140 is faster, it is more advantageous for technology implementation.

General annealing is performed in a high temperature chamber and takes 30 minutes or more, whereas in the present embodiment, since the annealing is performed in a state where the molded product is located inside the mold, heating and cooling are possible through the aforementioned heating wire, induction heating element, electric heater, planar heating element, steam heating, etc., and thus, an annealing process can be completed within a few seconds to tens of seconds.

FIG. 3 is a schematic plane view of an injection molding device 200 according to another embodiment of the present disclosure.

Referring to FIG. 3, the injection molding device 200 of the present embodiment includes a first mold 210 including a first injection port 211 through which a raw material is injected, and a second mold 220 including a heating member 260, a first movable mold 230 facing the first mold 210 and having a first cavity 231 formed therein, and a second movable mold 240 facing the second mold 220 and having a second cavity 241 formed therein.

Similar to the injection molding device 100 of FIG. 2, molding of the composition introduced from the first injection port 211 is performed in the first mold 210, and an annealing process of the molded product is performed in the second mold 220. The heating member 260 may be located in the first movable mold 230, the second movable mold 240, and the first mold 210 as well as the second mold 220.

Referring again to FIG. 3, the first movable mold 230 and the second movable mold 240 may be integrated such that the opening direction of the first cavity 231 and the opening direction of the second cavity 241 are opposite to each other. The rotating device 250 may be located on a side surface of the first movable mold 230 and the second movable mold 240, and the first mold 210 and the second mold 220 may be separated from each other, with the first movable mold 230 and the second movable mold 240 being interposed therebetween.

By the rotation S' of the rotating device 250, the first movable mold 230 and the second movable mold 240 change positions with each other, and can alternately face the first mold 210 and the second mold 220. At this time, it is preferable that the rotational axis of the rotation S' is perpendicular to the opening direction of the first cavity 231 and the opening direction of the second cavity 241.

FIG. 4 is a schematic plane view of an injection molding device 300 according to another embodiment of the present disclosure.

Referring to FIG. 4, the injection molding device 300 according to the present exemplary embodiment includes a first mold 310 including a first injection port 311, a second mold 320 including a heating member 360, a first movable mold 330 having a first cavity 331 formed therein, and a second movable mold 340 having a second cavity 341 formed therein, and an embossed pattern 370 may be formed on the surface of the second mold 320. That is, the injection molding device 300 has identical or similar configurations to those of the injection molding device 100 of FIG. 2, except that the embossed pattern 370 is formed.

Conventionally, in order to form a fine pattern on the surface of a plastic product manufactured through injection molding, an injection process is performed after pattern processing on a mold, or a roll stamping process is performed to separately form a pattern after injection, but there was a problem such as deterioration of the optical properties of the product due to a decrease in the transferability of fine patterns. In the present embodiment, an embossed pattern 370 is formed on the surface of the second mold 320 to form a fine pattern on the molded product together with an annealing process for the molded product.

Simultaneously with applying heat in the mold, the mold is closed to imprint a pattern, and thus, it is possible to produce a molded product having uniform transferability, and it is advantageous for reducing the gloss variation and corrosion variation in the final plastic product.

In addition, it is possible to form a fine pattern in the annealing process without adding a separate process, which can save time and costs.

Meanwhile, although the embossed pattern 370 is formed in FIG. 4, it is needless to say that an intaglio pattern (not shown) may be formed, and various shapes may be formed on the surface of the second mold 320 in accordance with a desired pattern.

FIG. 5 is a schematic plane view of an injection molding device 400 according to another embodiment of the present disclosure.

Referring to FIG. 5, the injection molding device 400 according to the present embodiment includes a first mold 410 including a first injection port 411, a second mold 420 including a heating member 460, a first movable mold 430 having a first cavity 431 formed therein, and a second movable mold 440 having a second cavity 441 formed therein. The second mold 420 may further include a second injection port 421 through which an additional raw material is injected. That is, the injection molding device 400 has identical or similar configurations to those of the injection molding device 100 of FIG. 2 except that the second injection port 421 is formed. Therefore, it is needless to say that the first mold 410, the first movable mold 430, and the second movable mold 440 as well as the second mold 420 may include a heating member 460.

In the injection molding device 400 of the present embodiment, since the second injection port 421 is formed in the second mold, double injection molding is possible. In other words, the molded product formed by injection molding in the first mold 410 is moved to the second mold 420, and then additional raw material is injected from the second injection port 421 to perform additional injection molding on the molded product.

The additional raw material may be the same material as the raw material injecting from the first injection port 411, or may be a different material. In addition, the position or number of the second injection port 421 is not particularly limited, and can be freely adjusted according to the design of the final product.

The injection molding device 400 of the present embodiment is capable of double injection molding through the second injection port 421, and furthermore, by adjusting the position or number of the second injection port 421 and the amount of additional raw material injected therein, final products of more various structures and materials can be produced.

Meanwhile, similar to the injection molding device 100 of FIG. 2, an annealing process may be performed in the second mold 420 of the injection molding device 400 of the present embodiment, and the order of the additional injection molding and annealing processes is not limited. This will be described later in FIG. 14.

FIGS. 6 to 10 are plane views illustrating an injection molding method using the injection molding device 100 according to FIG. 2.

Referring to FIG. 6, the injection molding method according to an embodiment of the present disclosure, includes injecting raw material into the first cavity 131 of the first movable mold 130 facing the first mold 110 and molding the material to produce a primary molded product 101. Specifically, the raw material is injected through the first injection port 111, and the primary molded product 101 is produced in conformance with the form of the first cavity, in a state where the first mold 110 and the first movable mold 130 are in contact.

Subsequently, referring to FIG. 7, a step of moving the position of the first movable mold 130 so that the primary molded product 101 faces the second mold 120 is performed.

Specifically, the first movable mold 130 is separated from the first mold 110, and then movement is made to the position of the first movable mold 130, without the primary molded product 101 being taken out from the first cavity 131. By the rotation S1 of the rotating device 150, the first movable mold 130 moves to face the second mold 120, and the second movable mold 140 moves to face the first mold 110. Since the opening direction of the first cavity 131 and the opening direction of the second cavity 141 are identical to each other, the rotation axis of the rotation S1 for positional movement is parallel to the opening direction of the first cavity 131 and the opening direction of the second cavity 141.

Subsequently, referring to FIG. 8, a step of heating and then gradually cooling the second mold 120 to anneal the primary molded product 101, and a step of injecting a raw material into the second cavity 141 of the second movable mold 140 facing the first mold 110 and molding the material to produce a secondary molded product 102 are performed.

At this time, it is preferable that the step of annealing the primary molded product 101 and the step of producing the secondary molded product 102 are performed simultaneously.

Specifically, in the state where the second mold 120 and the first movable mold 130 are in contact with each other, the second mold 120 and the heating member 160 inside the first movable mold 130 are heated at a temperature equal to or higher than the glass transition temperature and then gradually cooled to anneal to the primary molded product 101.

Simultaneously therewith, with respect to the raw material injected through the first injection port 111, in a state where the first mold 110 and the second movable mold 140 are in contact with each other, the secondary molded product 102 is formed in conformance with the shape of the second cavity 141, However, it is needless to say that, if necessary, the secondary molded product 102 may be produced after the primary molded product 101 is annealed, or alternatively the primary molded product 101 may be annealed after the secondary molded product 102 is produced.

Subsequently, referring to FIG. 9, a step of moving the position of the second movable mold 140 so that the secondary molded product 102 faces the second mold 120 is performed.

Specifically, the primary molded product 101 in FIG. 8 in which the annealing step is completed is taken out, and without having the secondary molded product 102 taken out from the second cavity 141, movement is made to the movable mold 140. By the rotation S2 of the rotating device 150, the first movable mold 130 is moved to face the first mold 110 again, and the second movable mold 140 is moved to face the second mold 120 again.

Subsequently, referring to FIG. 10, a step of heating and then gradually cooling the second mold 120 to anneal the secondary molded product 102, and a step of injecting into the first cavity 131 of the first movable mold 130 facing the first mold 110 and molding the material to produce a tertiary molded product 103 are performed.

Similarly, it is preferable that annealing the secondary molded product 102 and producing the tertiary molded product 103 are performed simultaneously.

Specifically, in the state where the second mold 120 and the second movable mold 140 are in contact with each other, the heating member 160 inside the second mold 120 and the second movable mold 140 is heated at a temperature equal to or higher than the glass transition temperature and then gradually cooled to anneal the secondary molded product 102.

Simultaneously therewith, for the raw material injected through the first injection port 111, the tertiary molded product 103 is formed in conformance with the shape of the first cavity 131, in a state where the first mold 110 and the first movable mold 130 are in contact with each other.

However, it is needless to say that, if necessary, the tertiary molded product 103 may be produced after annealing the secondary molded product 102, or alternatively the secondary molded product 102 may be annealed after producing the tertiary molded product 103.

That is, as described above, since the positions of the first movable mold 130 and the second movable mold 140 may be repeatedly moved one or more times, and an annealing process for a molded product whose injection molding is completed and a process of performing new injection molding thereafter can be performed continuously, this is advantageous for mass-producing plastic products with reduced birefringence or internal stress. In particular, without need to provide a separate additional device or process for annealing, it can be performed together with the injection molding process, thus simplifying the overall manufacturing process, minimizing process parameters, and a reduction of costs can also be expected.

FIGS. 11 and 12 are plane views illustrating an injection molding method using the injection molding device 200 according to FIG. 3. However, descriptions of parts overlapping with the injection molding method using the injection molding device 100 according to FIG. 2 will be omitted.

Referring to FIG. 11, the injection molding method of this embodiment includes moving the position of the first movable mold 230 so that the primary molded product 201 faces the second mold 220. Specifically, the primary molded product 201 produced between the first mold 210 and the first movable mold 230 is moved to face the second mold 220 by the rotation S'1 of the rotating device 250, without being taken out from the first cavity 231. Since the opening direction of the first cavity 231 and the opening direction of the second cavity 241 are opposite to each other, the rotation axis of the rotation S'1 for positional movement is perpendicular to the opening direction of the first cavity 231 and the opening direction of the second cavity 241.

Subsequently, referring to FIG. 12, a step of heating and then gradually cooling the second mold 220 to anneal the primary molded product 201, and a step of injecting a raw material into the second cavity 241 of the second movable mold 240 facing the first mold 210 and molding the material to produce a secondary molded product 202 are performed.

Similarly, it is preferable that annealing the primary molded product 201 and producing the secondary molded product 202 are performed simultaneously. Annealing the primary molded product 201 is performed in a state where the second mold 220 and the first movable mold 230 are in contact with each other, and producing the secondary molded product 202 is performed in a state where the first mold 210 and the second movable mold 240 are in contact with each other. In addition, the raw material is injected through the first injection port 211.

In the injection molding method of the present embodiment, the positional movement of the first movable mold 230 and the second movable mold 240 may be repeatedly performed one or more times, and an annealing process for a molded product whose injection molding is completed and subsequent processes of conducting new injection molding can be performed continuously. This is redundant with the previous description, so a detailed description will be omitted.

FIG. 13 is a plane view illustrating an injection molding method using the injection molding device 300 according to FIG. 4. However, the overlapping portion will be omitted, and the step of annealing the primary molded product 301 will be described.

Referring to FIG. 13, in a state in which the second mold 320 and the first movable mold 330 are in contact with each other, annealing is performed on the primary molded product 301 positioned in the first cavity 331. At the same time, in the state where the first mold 310 and the second movable mold 340 are in contact with each other, the raw material is injected into the second cavity 341 through the first injection port 311 to produce the secondary molded product 302.

At this time, since the embossed pattern 370 is formed on the surface of the second mold 320, annealing of the primary molded product 301 is performed and at the same time, a shape corresponding to the embossed pattern 370, that is, an intaglio shape, can be imprinted on the primary molded product 301.

In this way, since the embossed or intaglio shape is imprinted in the mold simultaneously with applying heat, there is an advantage in that a molded product having uniform transferability can be produced, and the gloss variation or corrosion variation in the final plastic product can be reduced. In addition, as described above, it is needless to say that various shapes can be formed on the surface of the second mold 320 according to the desired pattern.

FIG. 14 is a plane view illustrating an injection molding method using the injection molding device 400 according to FIG. 5. However, the overlapping portion will be omitted, and annealing the primary molded product 401 will be described.

Referring to FIG. 14, in a state where the second mold 420 and the first movable mold 430 are in contact with each other, annealing the primary molded product 401 located in the first cavity 431 may be performed. The annealing of the primary molded product 401 may further include injecting an additional raw material 404 into the primary molded product 401.

In more detail, annealing the primary molded product 401 may include performing double injection molding by injecting an additional raw material 404 through the second injection port 421. However, since there is no limitation in the order for each annealing of the primary molded product 401 and injection of the additional raw material 404, annealing may be performed on both the primary molded product 401 and the additional raw material 404 after the additional raw material 404 is injected, or additional raw material 404 may be injected after annealing for the primary molded product 401 is performed. In addition, annealing may be performed simultaneously the injection of the additional raw material 404.

Meanwhile, simultaneously with annealing of the primary molded product 401, the secondary molded product 402 may be produced in the second cavity 441 of the second movable mold 440. This is redundant with the description in FIG. 8 and thus will be omitted.

As previously mentioned with reference to FIG. 5, the position or number of the second injection ports 421 and the amount of the additional raw material 404 to be injected may be adjusted to produce final products of various structures and materials.

FIG. 15 is a photograph of a plastic product manufactured through an injection molding device according to an embodiment of the present disclosure.

Referring to FIG. 15, a portion indicated in black indicates an area without birefringence. Since the annealing process was performed in the mold, it was confirmed that internal stress and birefringence were effectively reduced. In addition, unlike the conventional heat treatment, there is no deformation of the optical product, and the annealing process can be completed within 1 to 2 minutes depending on the capacity of the heating member.

Although the preferred embodiments of the present disclosure have been described in detail above, the scope of the present disclosure is not limited thereto, and various modifications and improvements of those skilled in the art using the basic concepts of the present disclosure defined in the following claims also belong to the scope of rights.

The invention claimed is:

1. A method for injection molding a resin comprising the steps of:
    injecting a raw resin material into a first cavity of a first movable mold facing a first mold and molding the material to produce a primary molded product;
    moving the position of the first movable mold so that a surface of the primary molded product contacts a second mold, without the primary molded product being taken out of the first cavity;
    heating the second mold to anneal the primary molded product at a temperature equal to or greater than a glass transition temperature of the resin, then cooling; and
    injecting a raw material into a second cavity of a second movable mold facing the first mold and molding the material to produce a secondary molded product,
        wherein an embossed or intaglio pattern is formed on a surface of the second moveable mold, and wherein annealing the primary molded product includes simultaneously forming a pattern corresponding to the embossed or intaglio pattern on a surface of the primary molded product.

2. The method of claim 1, wherein annealing the primary molded product and producing the secondary molded product are performed simultaneously.

3. The method of claim 1, wherein moving the position of the first movable mold is performed once or more, repeatedly.

4. The method of claim 1, wherein heating the second mold is performed through a heating member inside the second mold.

5. The method of claim 1, further comprising the steps of:
    moving the position of the second movable mold so that the secondary molded product faces the second mold;
    annealing the secondary molded product by cooling after heating the second mold; and
    injecting a raw material into the first cavity of the first movable mold facing the first mold and molding the material to produce a tertiary molded product.

6. The method of claim 5, wherein annealing the secondary molded product and producing the tertiary molded product are performed simultaneously.

7. The method of claim 5, wherein each of the second mold, the first movable mold, and the second movable mold includes a heating member therein,
    wherein in the step of annealing the primary molded product, the first movable mold is heated together with the second mold, followed by cooling, and
    in the step of annealing the secondary molded product, the second movable mold is heated together with the second mold, followed by cooling.

8. The method of claim 1, wherein the first movable mold and the second movable mold are integrated with each other, wherein the integrated first movable mold and second movable mold rotate to change positions with each other.

9. The method of claim 1, wherein annealing the primary molded product includes injecting an additional raw material into the primary molded product.

10. The method of claim 1, wherein moving the position of the first movable mold comprises rotating the first movable mold about a rotational axis.

11. The method of claim 10, wherein the first cavity and the second cavity have openings extending in the same direction, and the rotational axis is parallel to the direction of the openings of the first and second cavities.

12. The method of claim 1, wherein the annealing of the primary molded product is performed for no more than 2 minutes.

13. The method of claim 1, wherein the forming of the pattern on the surface of the primary molded product comprises incising or engraving the pattern into the surface of the primary molded product.

* * * * *